Nov. 25, 1952  J. J. KROENLEIN  2,619,371
FOOD SPEAR
Filed Aug. 31, 1951
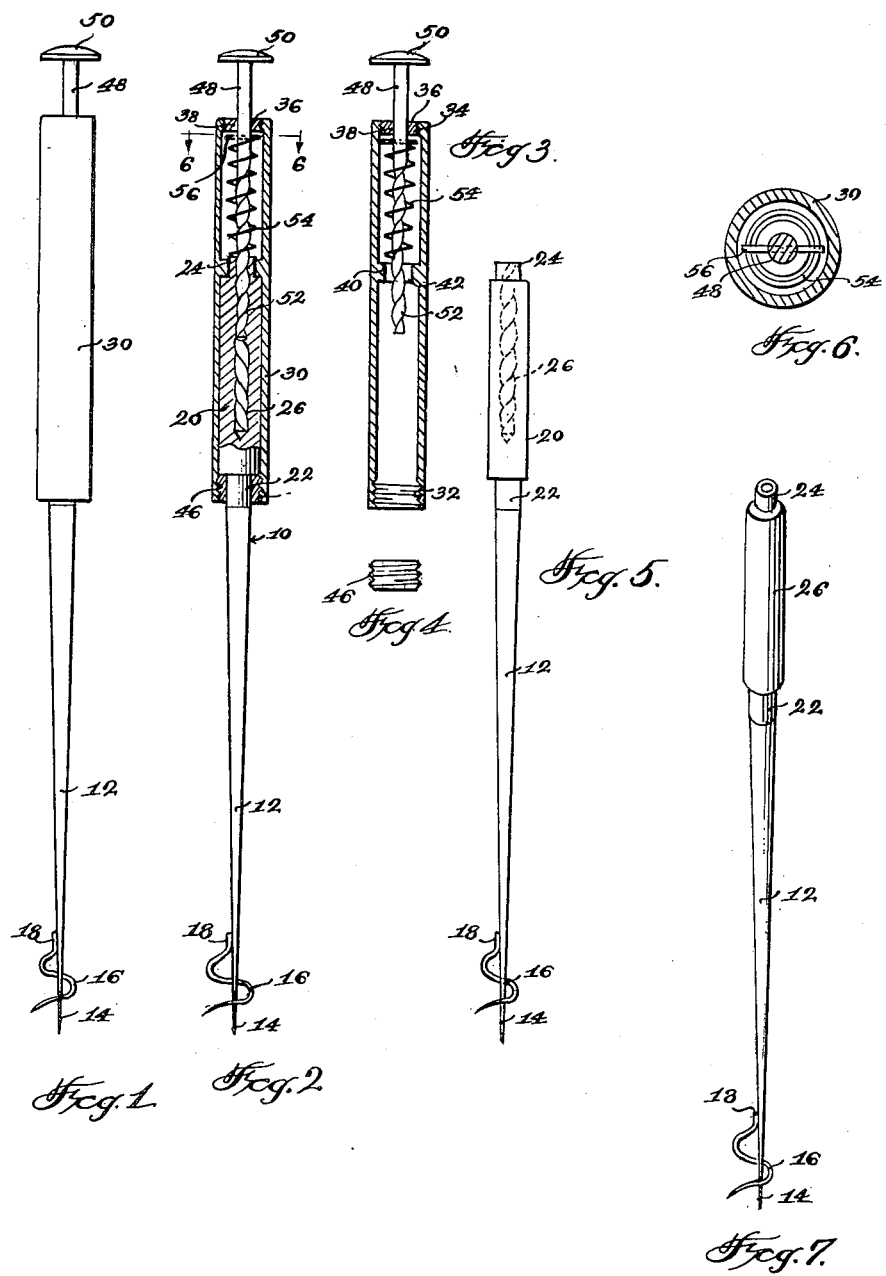
INVENTOR.
JOHN J. KROENLEIN
BY
Patrick D. Beavers
ATTY.

Patented Nov. 25, 1952

2,619,371

UNITED STATES PATENT OFFICE 2,619,371

FOOD SPEAR

John J. Kroenlein, Foster, Oreg., assignor of fifty per cent to C. L. Plansoen, Sweet Home, Oreg.

Application August 31, 1951, Serial No. 244,548

2 Claims. (Cl. 294—61)

This invention appertains to improvements in kitchen utensils and has for its primary object to provide a compact and inexpensive food spearing and holding device, which is especially useful in removing olives, pickles and the like from jars and in turning meat during cooking.

Another object of this invention is to provide a device of the above type with means for automatically releasing the impaled foodstuff, thus avoiding touching the foodstuff with the hands.

A further object of this invention is to provide a pointed pin on which food is impaled by forcing the pointed end thereof into the food and to provide a housing rotatably supporting the opposing end of the pin and having means for manually rotating the pin to impale the food and for automatically rotating the pin to release the food.

These and ancillary objects and structural features of merit are attained by this invention, the preferred embodiment of which is set forth in the following description and illustrated in the accompanying drawing, wherein:

Figure 1 is an elevational view of the device;

Figure 2 is a longitudinal sectional view thereof;

Figure 3 is a longitudinal sectional view of the housing;

Figure 4 is an elevational view of a bushing which is secured in the housing to retain the head of the pin therein;

Figure 5 is an elevational view of the pin;

Figure 6 is a cross sectional view taken on line 6—6 of Figure 2, and,

Figure 7 is an isometric view of the pin.

Referring now more particularly to the accompanying drawing, the food spear 10 includes an elongated pin 12, which is tapered to a fine point 14. A length of rigid wire 16 is fixed at one end, as at 18, by welding or the like to the pin above the point 14 and the wire is coiled about the pin to form a guard for the point and also to limit the extent of impalement of a piece of food on the pin, while assisting in the impalement and retention of the food on the pin.

A cylindrical head 20 is formed on the upper or major end 22 of the pin and terminates in a coaxially reduced tubular boss 24, a bore 26 is formed in the head in alignment with the boss and the boss and bore are spirally grooved, as at 28. The upper end 22 of the pin is round and of a constant cross section, the diameter of the end being equal to the diameter of the boss.

A hollow cylindrical housing 30 is provided and is formed with opposing open internally threaded ends 32 and 34, the end 34 forming the upper end and receiving a threaded bushing 36, which has a center opening 38. A partition 40 is formed transversely in the housing and has a large center opening 42, the opening being provided to receive the boss 24, so that the partition forms a shoulder on which the end of the head engages. An annular threaded bushing 46 is threaded in the end 32 of the housing and seats the opposing end of the head, the end 22 of the pin being rotatably disposed therein.

An actuating shaft 48 is provided, the shaft being slidably disposed through the opening 38 in the bushing 36 and having an outer head 50 which is of a size convenient for accommodating a user's finger or thumb in depressing the shaft. The shaft is spiraled, as at 52, with the spiral end being disposed through the boss and received in the bore 26.

A spring 54 is concentrically disposed on the shaft, the spring bearing at one end on the partition and having its other end seated on a cotter pin 56, which is transversely disposed through the shaft and which also limits the extent of outward movement of the shaft under the urgement of the spring.

In use, with respect to the removal of olives or the like from a jar, the pin is disposed in the jar with the head being held in the hand and the user's thumb being located on the head 50 of the shaft. The point 14 of the pin is forced into an olive with the shaft being depressed to rotate the pin and assist in the spearing and impalement of the olive.

The device, with the olive impaled on the point, is withdrawn from the jar and the olive is placed in a dish or similar receptacle and held against the side thereof. The shaft is then released and the spring urges the shaft outwardly to automatically rotate the pin and release the olive.

With large pieces or types of food, the wire will be rotated by the shaft in a cork screw fashion into the food to impale the food on the pin.

Having thus described the invention, what I claim as new is:

1. A device for impaling foodstuffs comprising a pin having a pointed end, a piece of wire coiled about said end and carried by the pin, a hollow cylindrical housing rotatably supporting at one end the opposing end of the pin, an axially movable finger shaft disposed through the opposite end of the housing, said shaft being spiraled and said supported end of the pin having a spirally grooved bore receiving the shaft.

2. A device for impaling foodstuffs comprising a pin having a pointed end, a piece of wire coiled about said end and carried by the pin, a hollow cylindrical housing rotatably supporting at one end the opposing end of the pin, an axially movable finger shaft disposed through the opposite end of the housing, said shaft being spiraled, said supported end of the pin having a spirally grooved bore receiving the shaft and a spring disposed on the shaft for urging the shaft outwardly from the housing.

JOHN J. KROENLEIN.

REFERENCES CITED

The following references are of record in the file of this patent:

UNITED STATES PATENTS

| Number | Name | Date |
|---|---|---|
| 166,171 | White | July 27, 1875 |
| 529,401 | McCoy et al. | Nov. 20, 1894 |
| 1,623,375 | Asmus | Apr. 5, 1927 |
| 2,522,219 | Gaeta | Sept. 12, 1950 |